CHANGEABLE NAMEPLATE

Filed Jan. 6, 1966

INVENTORS
VIRGIL HILL
FRANK W. RUSSO
BY Herbert E. Kidder
AGENT

CHANGEABLE NAMEPLATE

Filed Jan. 6, 1966

INVENTORS
VIRGIL HILL
FRANK W. RUSSO
BY Herbert E. Kidder
AGENT

United States Patent Office 3,419,983

Patented Jan. 7, 1969

3,419,983
CHANGEABLE NAMEPLATE

Virgil Hill, 843 Carlotta Court, Redlands, Calif. 92373, and Frank W. Russo, 1404 Roxbury Drive, San Bernardino, Calif. 92404

Filed Jan. 6, 1966, Ser. No. 519,065
U.S. Cl. 40—95 2 Claims
Int. Cl. G09f *11/24*

ABSTRACT OF THE DISCLOSURE

A changeable nameplate having a plurality of tapes bearing letters and/or numerals which are exposed through apertures in the housing. The ends of each tape are wound onto two spools disposed one above the other, each having a radial flange that can be turned by the thumb to advance the tape in one direction or the other. Between the spools is a small idler wheel of rubber, which bears against the flanges of both spools in each pair. When one of the spools is turned, it drives the other spool through the idler wheel.

The present invention relates to devices for displaying information such as names, numbers, short messages, prices, and the like, and the primary object of the invention is to provide a new and improved changeable nameplate, or sign, for use on a desk or countertop, which is extremely versatile and capable of being used for many different purposes.

The present invention is particularly useful as a nameplate for use on a desk or countertop in an office, bank, or other public place, where personnel may change frequently, inasmuch as it may be quickly and easily changed to display the name of whoever is in charge at the moment, or who may be sitting at a particular desk or table. Conventional nameplates and sign devices are usually made of plates which are molded or formed of various materials, with the name or information engraved or painted thereon. Such nameplates are relatively expensive, and can only be used for one person, the one whose name is engraved thereon. As a result, it is expensive and not always practical to have a nameplate for each person who may be called upon to sit at a particular desk, or to take charge of a particular area, and it therefore becomes necessary to use make-shift indicating means, which detracts from the decor of the office because of its relatively crude, unfinished appearance. Any such make-shift arrangement is particularly undesirable in the case of banks or other institutions, to whom a public image of permanence and stability is an important asset.

The nameplate of the present invention can be changed on a moment's notice to display the name of whoever may be in charge, even though for a short period of time, thereby eliminating confusion and preventing misunderstanding as to the identity of personnel who are required to deal directly with the public or with other employees. While conventional nameplates serve a limited purpose, they do not permit instant change to identify an employee temporarily replacing the person whose name appears on the name plate. This situation is particularly acute where there is a constant personnel change or turnover, or where employees are constantly shifted around to different locations or positions, as required by changing conditions. In situations of this kind, the use of permanent nameplates is completely impractical because of the cost of providing everyone with a nameplate. Another disadvantage of the permanent nameplate is the length of time required for delivery of an engraved or hand-lettered nameplate. In some cases, this may amount to several weeks, during which time, the employee is without suitable identification.

An important object of the invention, therefore, is to provide a changeable nameplate that is immediately available for use when needed; that can be used over and over; and that does not have to be scrapped just because a particular employee has been shifted or terminated. A considerable saving can thus be realized, as a minimum number of nameplates can be utilized to convey information as to names, titles, etc., and whenever a nameplate is no longer needed for a particular person or location, it can be transferred to another location or person, and the displayed information changed accordingly.

Another object of the invention is to provide a changeable nameplate that is neat and attractive in appearance, and that has considerable design flexibility. To this end the nameplate of this invention is provided with an attractively styled housing having replaceable end caps of contrasting or harmonizing colors or textures, and also having replaceable window panes of varying colors, as well as tapes of different colors and lettering styles, which can be interchanged in varying combinations to produce a great variety in ornamental appearance, so as to adapt it to any decor. The housing is made with a broad base that affords better balance, and the face is slanted at a pleasing angle, making the nameplate easy to read from any normal position in front of the desk or counter.

A further object of the invention is to provide a changeable nameplate having a unitized construction, wherein the sign mechanism is contained in an assembly that is removable as a unit from the housing for servicing or for changing tapes. A related advantage of this feature is that the sign mechanism can be used in other housings of different design.

Another object of the invention is to provide a changeable nameplate using a series of tapes arranged side-by-side and having letters and other indicia printed thereon, which are drawn vertically past a viewing window on the front face of the housing, through which the letters may be read, and wherein means is provided for keeping the tapes properly aligned with respect to one another and to the viewing window.

A further object of the invention is to provide a changeable nameplate of the class described, wherein means is provided for keeping the tapes taut at all times. To this end, each of the said tapes is wound onto a first spool at one end, and at the other end onto a second spool, the said spools being arranged one above the other and spaced slightly apart, with a synchronizing idler wheel between them frictionally engaging both spools so that they turn in unison. This prevents relative rotation between the spools and keeps the tapes taut at all times. One advantage of this arrangement is that either of the spools can be turned with the thumb to advance the tape in one direction or the other, without slackening the tape. Another advantage is that it provides a changeable nameplate which is readily adapted for power-driving the letter tapes by using a motor-driven friction wheel, similar to an electric eraser, which can be pressed against the said synchronizing idler wheel to drive the tapes in either direction. Yet another advantage is that it provides a changeable nameplate which is simple in design and low in manufacturing cost, since the assembly is made up of just a few basic parts that are used in multiples, and this makes for low tooling costs.

A further object of the invention is to provide a changeable nameplate with a removable internal assembly of tapes, as described above, wherein means is provided for adjusting the assembly laterally with respect to the housing, for the purpose of centering the name in the viewing window, particularly when there are fewer letters than there are tapes, so that one or more of the tapes at each end is blank.

These and other objects and advantages of the invention will become apparent to those skilled in the art upon consideration of the following detailed description of the preferred embodiment thereof, reference being had to the accompanying drawings, wherein.

Figures 1, 2, 6:
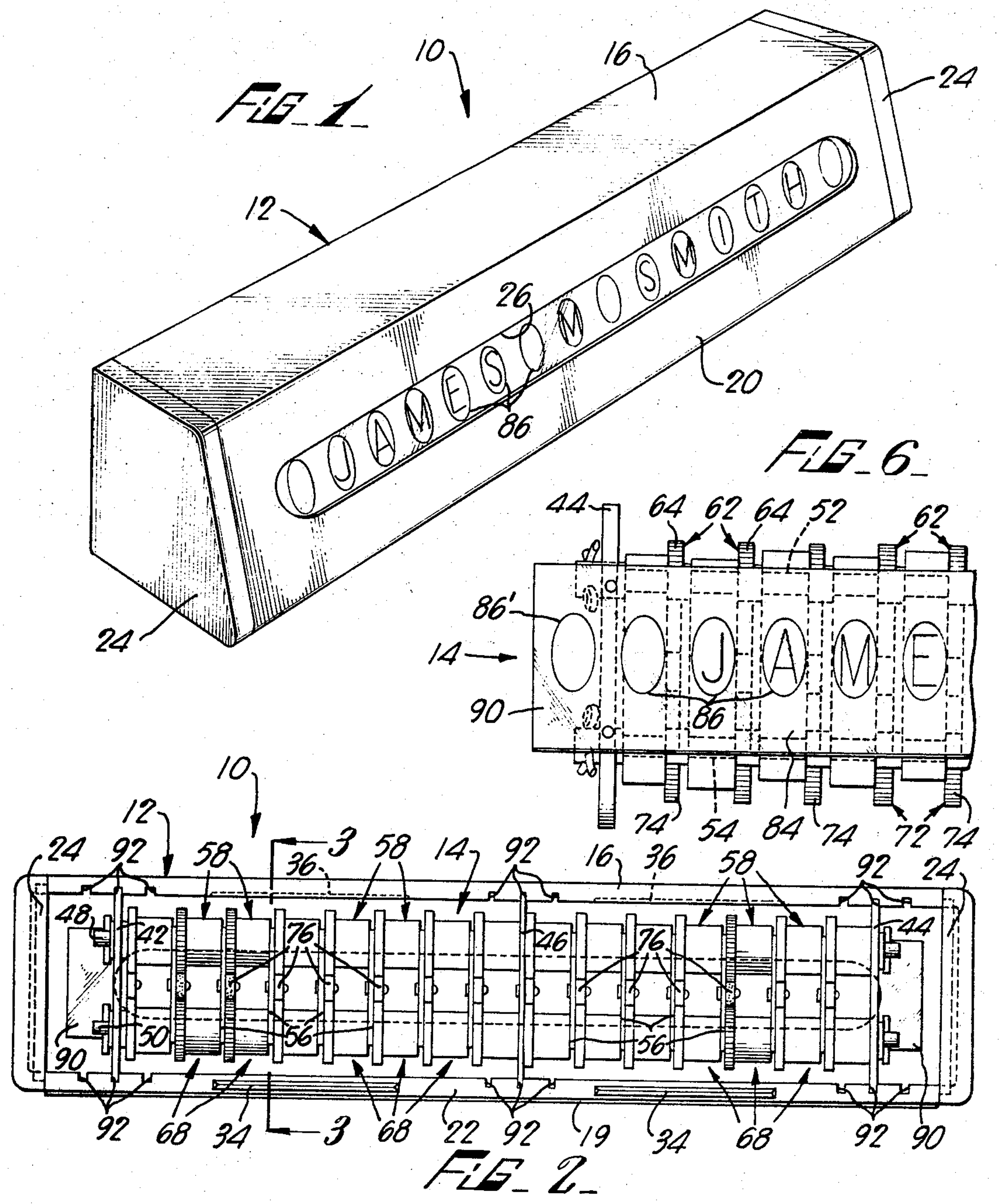
FIGURE 1 is a perspective view of a changeable nameplate embodying the principles of the invention.
FIGURE 2 is a rar elevational view of the same, with the back dropped down to expose the internal assembly.
FIGURE 6 is a fragmentary front elevational view of the internal tape assembly, showing one end thereof.

In the drawings, the changebale nameplate of the present invention is designated in its entirety by the reference numeral 10, and comprises a horizontally elongated housing 12, which may be molded of plastic or any other suitable material. The housing 12 may be finished in any desired color, and may have smooth or textured surfaces. Contained within the housing is an internal assembly 14, consisting of a plurality of letter tapes arranged side-by-side and mounted on individual spools, as will be described in detail presently. The housing 12 consists of parallel top and bottom walls 16 and 18, respectively, with an inclined front wall 20. The bottom wall 18 may have a felt pad 19 cemented to its underside to protect the desk or counter top from being scratched, and swingably connected to the rear edge of the bottom wall is a back 22. The ends of the housing are closed by removable end caps 24, which may be of the same color and finish as the housing, or of contrasting color and/or texture.

The front wall 20 of the housing is formed with an elongated viewing window 26, which extends almost the full length of the housing, and mounted on the back side of the front wall so that it covers the entire window is a transparent plastic pane 28, which may be clear or colored, as desired. The plastic pane 28 is removably secured to the back side of the face 20 by a plurality of rearwardly projecting studs 30, each of which has a slightly enlarged head that is forced through an undersized hole in the plastic pane. The studs 30 may be molded integrally with the housing, or separately attached thereto.

The bottom edge of the housing back 22 has hinge barrels 32 formed thereon, which cooperate with companionate hinge barrels on the bottom wall 18 of the housing to provide a pivot connection between the back and the housing. The top edge of the housing back 22 has two slightly raised latch ridges 34 extending for a portion of its length on both sides of the midpoint thereof, and these ridges seat in shallow latch channels 36 formed in the underside of the housing top 16, so as to hold the housing back 22 in the closed position. The back 22 may have any suitable means provided thereon, such as a finger-hole or the like, for gripping the back to pull it open against the resistance of the latch 34, 36.

At each end of the housing, the top and bottom walls 16, 18, and front face 20 are formed with laterally projecting flanges 38, which are received within a shouldered recess 40 in the end cap 24 to provide a snug fit for the end cap. The outer surfaces of the end caps and housing are smoothly faired.

The internal assembly 14 comprises two end plates 42,

44, and a center plate 46, which are joined together by upper and lower shafts 48, 50, and upper and lower guide rods 52, 54. The edges of plates 42, 44 and 46 are parallel to the corresponding sides of the housing 12, as best shown in FIGURE 2, and the two shafts 48, 50 lie in a vertical plane parallel to the rear edges of the plates, while the two guide rods 52, 54 lie in a plane parallel to the inclined front edges of the plates. Mounted on the shafts 48, 50 between the plates 42, 44, 46 are a plurality of smaller, rectangular support plates 56, which are equidistantly spaced apart from one another.

Journaled on the upper shaft 48 between adjacent pairs of support plates 56 are upper spools 58. The spools 58 are preferably molded of plastic, and each consists of a cylindrical hub 60 having a central bore through which the shaft 48 passes. Projecting radially from one end of hub 60 is a radial flange 62 that serves as a thumb wheel. The outer edge of the wheel 62 is milled, or knurled, at 64. Attached at one end to the hub 60 is a flexible tape 66 of paper, plastic, or the like, having all the letters of the alphabet printed thereon, together with numerals from 0 to 9 and any other indicia that might be desired, such as punctuation marks and various symbols that are commonly used. The letters on the tapes may be all capitals, or a combination of capital and lower case, and the tapes may also be printed with alphabets of any language, or with two or more alphabets on the same tape.

Figure 3:
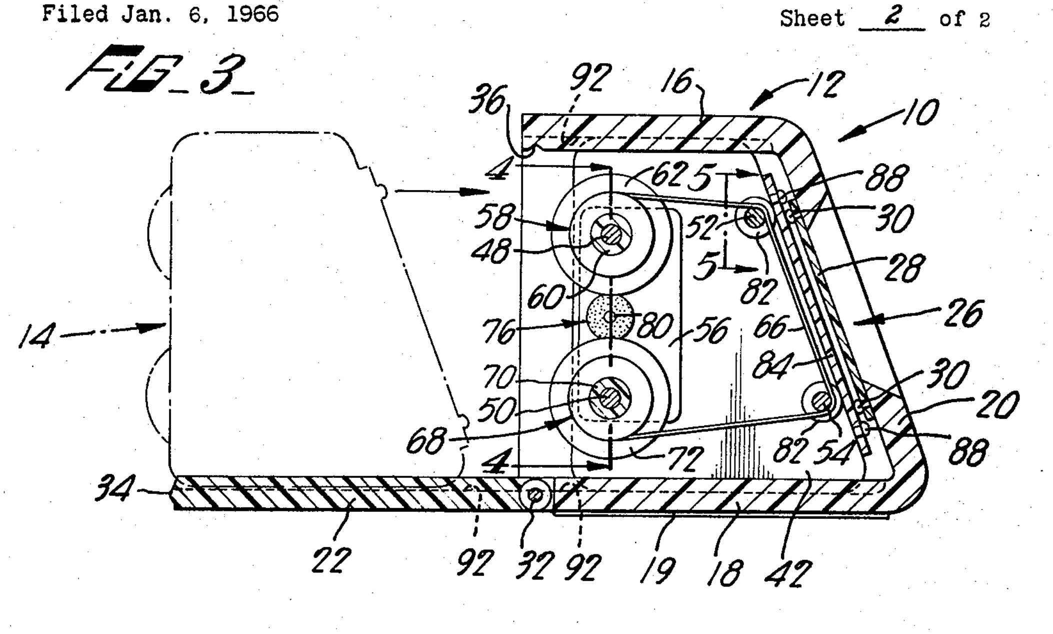
FIGURE 3 is an enlarged sectional view taken at 3—3 in FIGURE 2, showing the internal assembly both inside the housing and (in phantom lines) removed from the housing.

The tape 66 extends forwardly from the top of spool 58, over the upper guide rod 52, down past the viewing window 26, around and under the lower guide rod 54, and back to a lower spool 68, around which it is wound as shown in FIGURE 3. Lower spool 68 is similar to upper spool 58, and comprises a hub 70 having a flanged wheel 72 which is milled or knurled on its outer edge at 74.

Figures 4, 5, 7:
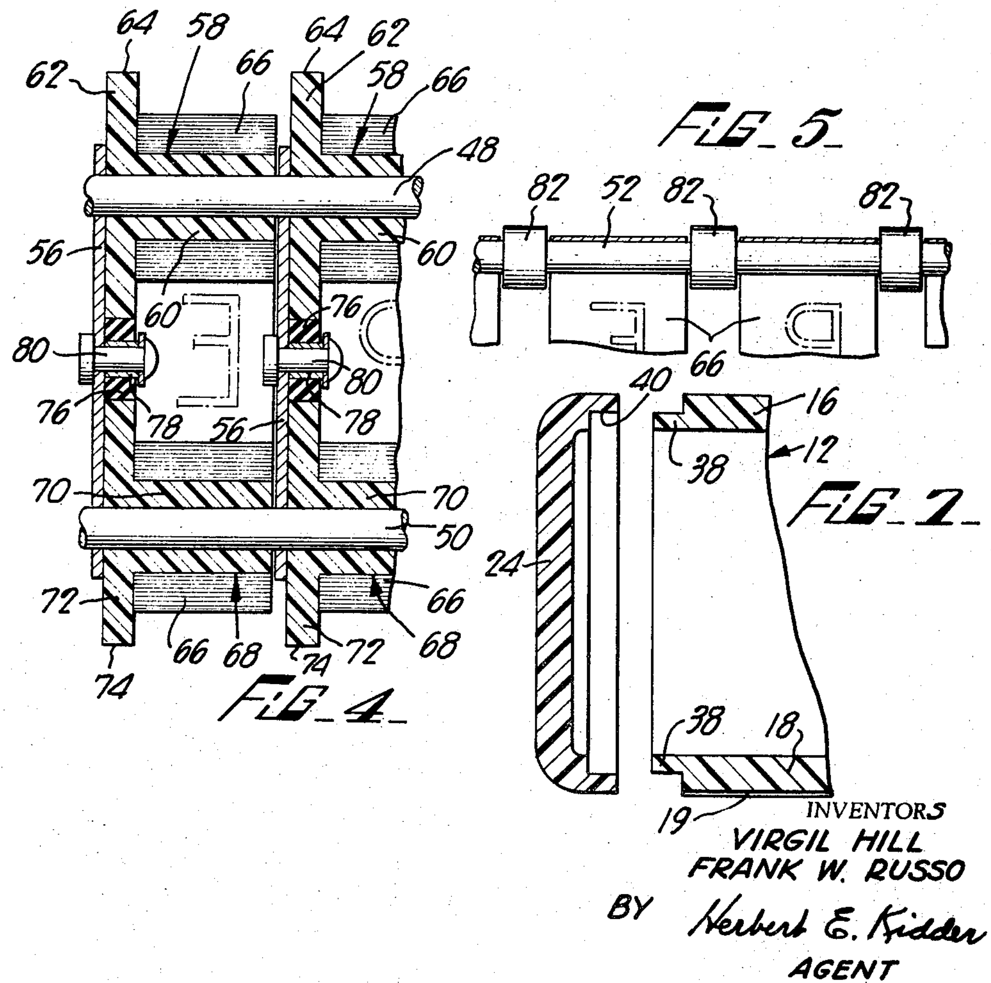
FIGURE 4 is an enlarged fragmentary sectional view taken at 4—4 in FIGURE 3.
FIGURE 5 is an enlarged fragmentary sectional view taken at 5—5 in FIGURE 3.
FIGURE 7 is a fragmentary sectional view through one end of the housing, showing an end cap removed therefrom.

Frictionally engaging the milled edges of wheels 62 and 72 of the upper and lower spools, in a synchronizing idler wheel 76 made of rubber or synthetic elastomer. Wheel 76 is preferably made with a tubular brass hub 78, which turns freely on a short shaft 80 that is mounted on the adjoining support plate 56, as shown in FIGURE 4. The rubber wheel 76 has a good frictional grip on the milled edges of both wheels 62, 72, and turns the two spools in unison, in the same direction. This has the effect of unwinding the tape 66 from one of the spools and winding it up on the other at approximately the same rate, so that the tape is held taut at all times. However, if the tape should slacken for any reason, either one of the spools 58, 68 may be turned while the other is held stationary, since the frictional drive permits slippage when force is applied.

The two guide rods 52 and 54 are mounted close to the front edges of plates 42, 44, 46, and are closely adjacent the back side of front wall 20. The upper guide rod 52 is positioned slightly above the top edge of window 26, and the lower guide rod 54 is positioned slightly below the lower edge of the window, so that the tape 66, in passing from the upper guide rod to the lower, is stretched in an inclined plane parallel to the front wall 20 and closely behind the back side thereof. As best shown in FIGURE 5, each of the guide rods 52, 54 has a plurality of longitudinally spaced, radial enlargements 82, that define shallow channels through which tapes 66 pass. The enlargements 82 are each approximately the same width as the flange wheels 62, 72, and are spaced apart from one another approximately the same width as the tapes 66. The tapes are thus held by the enlargements 82 against shifting endwise with respect to the window 26, and are maintained in accurate alignment with their respective spools 58, 68.

Mounted on the inclined front edges of the plates 42, 44, 46, immediately behind the transparent plastic window pane 28, is a plastic cover 84, having a plurality of elliptical openings 86 provided therein, each of which is in line with a corresponding tape 66. Plastic cover 84 is preferably attached to the front edges of plates 42, 44, 46 by studs 88, having slightly enlarged heads which are forced through undersized holes in the cover 84, so that the latter may be easily removed and replaced with another, if desired. The plasic cover 84 is preferably opaque, and may be the same color as the background color of the tapes 66, or may be in a contrasting color. The openings 86 are large enough in height and width to expose the largest letters on the tapes, and are not necessarily elliptical in shape, but may be any other shape.

At each of its ends, the plastic cover 84 has an extension 90 that projects beyond the adjacent end plate 42, 44, and formed in this extension is a dummy elliptical opening 86', which is covered on the back side in a manner to simulate a blank tape. The purpose of this arrangement is to provide an extra opening 86' at either end of the assembly, which can be exposed at one end of the window when the assembly 14 has been shifted toward the other end of the housing to center a name or message in the window and to give the nameplate a symmetrical appearance. That is to say, the dummy opening 86' makes it appear that there is an equal number of blank openings 86 at each end of the lettering, whenever an uneven number of letters makes it necessary to shift the assembly one way or the other in the housing to center the name in the window.

Endwise shifting of the assembly 14, in the housing 12, to center the name in the window, is made possible by three groups of three laterally spaced grooves 92, that are formed in the inside surfaces of the top and bottom walls 16, 18, and in the back 22. Each of the groups of grooves 92 is located to receive the edges of corresponding plates 42, 44, 46, and each group consists of three grooves which are spaced apart from one another approximately half of the distance between centers of adjoining tapes. When the name spelled out by the tapes 66 has a number of letters such that it can be centered on the assembly 14, the assembly is centered in the housing 12 by seating the upper and lower edges of the plates 42, 44, 46 in the center groove of each group of three. This centers all of the elliptical openings 86 in the window 26, and the two dummy openings 86' are hidden. However, if the number of letters in a name is such that the name cannot be centered on the assembly 14, the assembly can be shifted one way or the other in the housing by a distance equal to half the distance between tapes, thereby shifting one of the elliptical openings 86 partly beyond the end of window 26, and partially exposing the dummy opening 86' at the other end. With the internal assembly 14 thus shifted, the name on the tapes is centered in the window, and there appears to be the same number of blank openings 86 at each end of the name. Grooves 92 in the back 22 line up with their corresponding grooves in the bottom 18 and provide a convenient means of aligning the assembly 14 so that it can be slid forwardly into the housing 12, with the plates 42, 44, 46 seated in their proper grooves.

To change the name displayed on the nameplate, all that is necessary is to drop the back 22 down to the horizontal position, shown in FIGUR 3, and turn the several thumb wheels 62 or 72 to bring the appropriate letters into the elliptical openings 86. Since the two thumb wheels are driven in unison by the synchronizing wheel 76, it is possible to drive the tapes in either direction by turning either the upper or lower thumb wheel. If it is desired to pull the assembly 14 out of the housing for service or to replace it with another, all that is necessary is to grasp the rear edge of the center plate 46 and pull the assembly rearwardly out of the housing. The plastic cover 84 can then be replaced with another of different color, if desired, or the transparent plastic pane 28 on the inside of the housing may be pulled off the studs 30 and replaced by another of different color.

If it is desired to illuminate the tapes from behind, which would accent the name displayed, there is ample space between the end plates 42, 44, and the center plate 46, and between the front edges of the rectangular support plate 56 and the tapes 66 where they pass between guide rods 52, 54, to install small electric light bulbs. The installation of such electric light bulbs is believed to be obvious to those skilled in the art, and need not be shown or described in detail here.

While we have shown and described in considerable detail what we believe to be the preferred form of our invention, it will be understood by those skilled in the art that various changes may be made without departing from the broad scope of the invention as defined in the claims that follow.

We claim:

1. In a changeable nameplate having an elongated, box-like housing provided with horizontally aligned viewing windows in one wall thereof; a pair of spools, rotatably mounted one above the other within said housing in vertical alignment with each of said viewing windows; a flexible tape having its ends connected to and wound onto both of said spools; each of said tapes having the letters of the alphabet and/or other indicia printed thereon, and said tapes passing vertically past said window to expose one letter at a time therein; and means guiding said tapes so that they lie flat in the plane of said one wall while passing said window; the improvement comprising:

means for selectively driving either of said spools in the direction to wind up said tape thereon, so as to advance the tape in one direction or the other; and an idler wheel rotatably mounted in said housing between said spools and frictionally engaging both spools, whereby driving one of the spools to wind the tape thereon causes the other spool to be driven in the direction to unwind tape therefrom;

said idler wheel being adapted to slip slightly with respect to either of said spools when the other is restrained against turning freely, thereby enabling said tape to be drawn taut between said spools; and said idler wheel being operable to restrain said spools against turning freely relative to one another when released, thereby preventing said tape from becoming slack.

2. The invention of claim 1, wherein said means for driving either of said spools comprises a radial flange on each spool, one edge of which projects beyond the supporting structure so that it can be engaged and turned by the thumb:

said idler wheel bearing against the outer edge of both spool flanges in each pair, in frictional driving contact therewith.

References Cited

UNITED STATES PATENTS

| | | | |
|---|---|---|---|
| 1,246,860 | 11/1917 | Brachtl et al. | 40—86 |
| 1,691,414 | 11/1928 | Thornton. | |
| 2,601,733 | 7/1952 | Durey | 40—86 |
| 2,792,653 | 5/1957 | Bozich | 40—86 |

FOREIGN PATENTS

| | | |
|---|---|---|
| 503,840 | 3/1920 | France. |

EUGENE R. CAPOZIO, *Primary Examiner.*

R. CARTER, *Assistant Examiner.*

U.S. Cl. X.R.

40—86; 35—76